Oct. 28, 1930.  A. O. AUSTIN  1,779,415
JOINT FOR MULTIPLE CONDUCTOR CABLES
Filed March 16, 1927
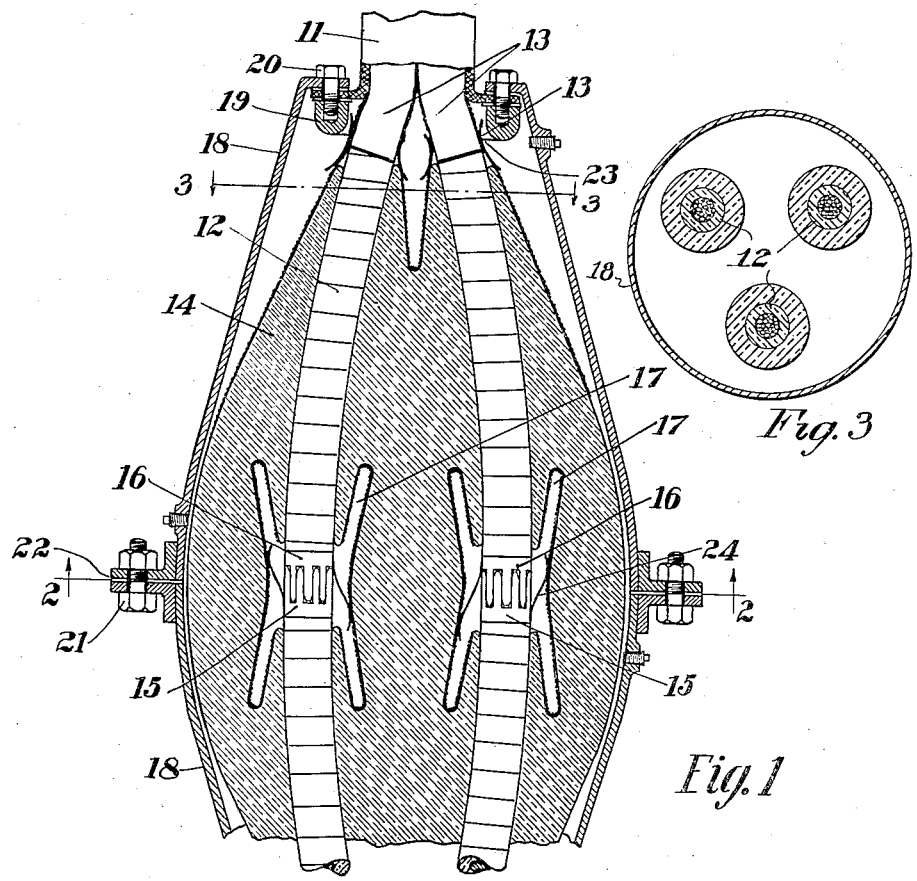
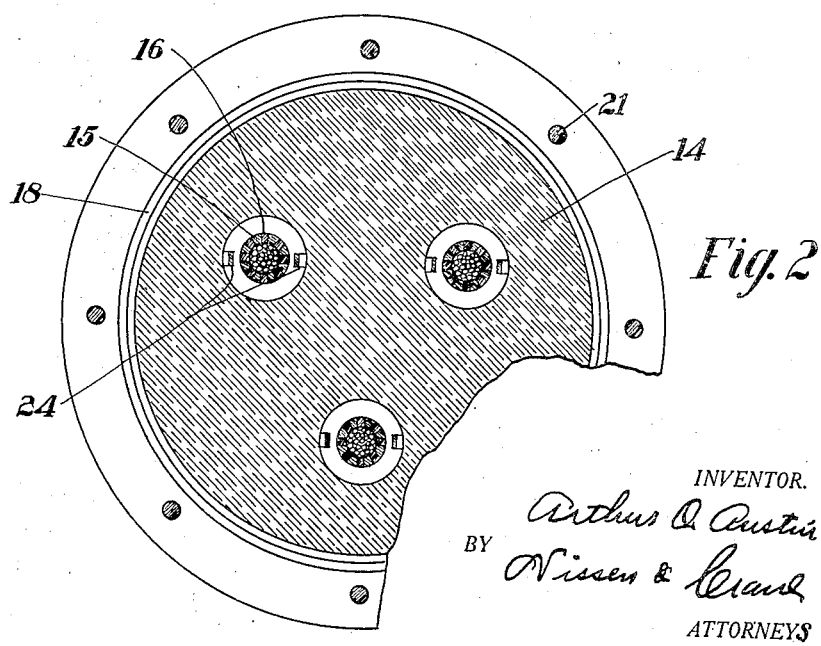
INVENTOR.
Arthur O. Austin
BY Nissen & Crane
ATTORNEYS Patented Oct. 28, 1930

1,779,415

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

JOINT FOR MULTIPLE-CONDUCTOR CABLES

Application filed March 16, 1927. Serial No. 175,657.

This invention relates to means for connecting adjacent ends of high potential cables having multiple conductors therein and has for its object the provision of a cable joint which may be conveniently installed and which will provide insulation at the joint which will be substantially as efficient as the insulation throughout the remaining portion of the cable. Other special objects will appear from the following description and claims. The invention is exemplified in the combination and arrangement of parts shown in the accompanying drawing and described in the following specification and it is more particularly pointed out in the appended claims.

In the drawing—

Fig. 1 is a fragmentary sectional view through a cable joint, showing one embodiment of the present invention.

Fig. 2 is a transverse section substantially on line 2—2 of Fig. 1.

Fig. 3 is a section on line 3—3 of Fig. 1.

Sections of cable, particularly those having multiple conductors operating at high voltage are difficult to connect up. The present invention deals with an improved method of connecting up multiple cables, particularly those where the individual cables are covered by a metal tape or foil.

In order to facilitate making up different sections of cable, I have devised a new type of joint which is easily installed and which will readily develop the dielectric strength of the cable.

Fig. 1 shows one form of the invention, cross-section being shown in Fig. 2. Several cables are covered with a lead sheath 11, the individual conductors being covered with insulation 12 and metal foil or tape 13. The tape is removed from the portion of cable which will be inside of the dielectric member 14. The complementary terminal members 15 and 16 are attached to the conductors. In order to prevent charging current flowing along the surface of the cable, control pockets 17 may be provided. Metallic spring clips 24 may be secured to the members 15 and 16 in position to spring outwardly into contact with the walls of the pocket 17 to make electrical connection between the connectors and walls of the pockets. The walls of the pockets may be coated with conducting material as shown in the drawing. To install the cable joint, the sections of the metallic housing or covering 18 are slipped back over the cable and the lead sheath 11 flared outwardly. The clamping rings 19 are then threaded over the loose ends of the cable. The ends of the cables are then forced through the openings in the insulating block 14 from opposite ends of the block to cause the connectors 15 and 16 to interengage and the bolts 20 are tightened up. This clamps the lead sheath and makes a tight joint. The two halves of the outer jacket may then be tightened up by the bolts 21, clamped up on a gasket 22. The metallic layer 13 on the outside of the conductors may be sprung outwardly in some cases so that it will come in contact with the metallized surface on the entering cones or a small metallic spring clip 23 may be placed over it so that contact will be insured. This clip may be either fastened to the tubular projects on the insulating block 14 or on the individual cables. Where the several openings are placed in the single insulated member, the construction is somewhat simplified and in some cases considerable space may be saved.

I claim:

1. A cable joint comprising a solid, unitary, dielectric member having a plurality of perforations spaced apart and extending through said dielectric member and completely surrounded by said dielectric member and separate conductors disposed in said perforations and having connected ends within said dielectric member between the ends of said perforations, said perforations being of sufficient size throughout to permit the insertion of the conductors into position therein after the formation of said dielectric member.

2. A cable joint for a multiple conductor cable, comprising a unitary block of solid dielectric material having a plurality of spaced perforations extending therethrough said perforations being separated at their middle points and converging toward one another at their opposite ends, and completely surrounded by the material of said block, the separate conductors of a multiple conductor cable being threaded into said perforations from the opposite ends thereof and having coupling members connecting the opposite portions of each of said conductors said coupling members being disposed between the ends of said perforations.

3. The combination with adjacent ends of multiple conductor cable sections of means for forming a connection between adjacent ends of the conductors of said cable sections said means comprising a unitary block of solid dielectric material having perforations extending therethrough and completely surrounded by the material of said block for receiving the ends of said conductors, said perforations having imperforate walls and being large enough throughout to permit insertion of said cable sections therein after formation of said block, coupling members connected to the respective ends of said conductors and provided with inter-engaging means arranged to unite automatically the ends of said conductors when said ends are moved together and a housing member for inclosing said block and holding the ends of said cable from separating.

4. The combination with adjacent ends of multiple conductor cable sections of means for joining the conductors of said sections comprising a solid, unitary dielectric body having perforations therethrough completely surrounded by the material of said body, said perforations being separated at their middle portions and converging toward each other at their outer ends to receive the conductors of said cable sections, said dielectric body being tapered toward the portions thereof at which said perforations terminate the ends of said conductors having coupling members thereon arranged to form electrical connection between said conductors when said ends are inserted into the opposite ends of said perforations respectively to bring said couplings together within said perforations and a housing member attached to said cable sections for holding said sections together with said couplings in engagement within said perforations.

5. The combination with a pair of multiple conductor cable sections having separately insulated conductors and an outer metal sheath, of means for joining the adjacent ends of the conductors of said cable sections comprising a unitary, solid, dielectric body having spaced perforations extending therethrough, said perforations being completely surrounded by the material of said body and converging toward each other at opposite ends of said body for receiving the conductors of said cable sections, said conductors having means on the ends thereof for forming electrical connection with their complementary conductors when the ends of said conductors are brought together within said dielectric body, said dielectric body being tapered toward the ends thereof through which said perforations open, a conductor coating disposed over the outer surface of the said end portions of the dielectric body and in electrical connection with said outer metal sheath, and a housing member connected to the metal sheath of each of said conductor sections and enclosing said dielectric body.

6. The combination with adjacent ends of a multiple conductor cable having separately insulated conductors and an outer metal sheath of means for joining the conductors of said cable ends comprising a dielectric body having spaced perforations therethrough converging toward each other at opposite ends of said body for receiving the ends of the conductors of said cable sections said conductors having couplers mounted on the ends thereof for forming electrical connection when said couplers are brought together within said body, said body having flux control pockets formed therein adjacent the contacting couplers of said conductors.

7. The combination with adjacent ends of multiple conductor high potential cable sections, each having separately insulated conductors and an outer metal sheath of means for joining the conductors of said cable sections comprising a solid, unitary, dielectric body having spaced perforations therethrough completely surrounded by said dielectric body and opening at opposite ends of said body, couplers on the ends of said conductors for forming electrical connection with complementary conductors when said couplers are brought together within the perforations in said body, the opposite ends of said body being tapered and provided with a conductor coating on the outer surface thereof said conductors having a conductor covering surrounding the insulation thereof, the conductor covering on each of said conductors being connected with the conductor coating on the outer surface of said body and a housing member enclosing said body and connected to the metal sheath of said cable sections.

8. A joint for a multiple conductor cable having an outer metal sheath comprising a housing formed of separable sections each section being connected to the metal sheath of adjacent cable sections and a solid, unitary, dielectric body disposed in said housing and having spaced perforations therethrough for receiving the separate conductors of said cable sections, said perforations being separately and completely surrounded by the material of said body and of a size throughout to permit insertion of said cable sections thereinto after the formation of said dielectric member.

9. The combination with adjacent ends of the cable sections of a multiple conductor cable, of a dielectric body having spaced perforations therethrough for receiving the conductors of said cable sections, projections on said body surrounding the ends of said perforations and tapered toward the conductors disposed within said perforations each conductor having an individual metal sheath terminating adjacent the entrance to its said perforation and a conductor coating surrounding each of the projections on said dielectric body and connected to the individual metal sheaths of said conductors.

10. The combination with adjacent ends of multiple conductor cables, said cables comprising a plurality of conductors separately insulated and provided with individual metal sheaths enclosing the insulation thereof and a common metal sheath inclosing all the said conductors, of a dielectric body having spaced perforations therethrough for receiving adjacent ends of the conductors of said cable sections, couplings on the ends of said conductors for electrically connecting complementary conductors within said dielectric body, projections on said body surrounding the end portions of the perforations therein and tapered toward the conductors disposed within said perforations, a conductor coating on each of said projections connected with the individual metal sheaths of said conductors said individual metal sheaths being terminated adjacent the entrance to its said perforation and a metal housing enclosing said dielectric body and connected with the outer metal sheaths of said cable sections, said outer metal sheaths being terminated at their connections with said housing.

11. The combination with adjacent ends of multiple conductor cable sections having separately insulated conductors, of a connector block of dielectric material having higher specific inductive capacity than the insulation for said conductors, said connector block having spaced passages opening adjacent each other at opposite ends of said block, conductor sheaths surrounding the insulation of the individual conductors and terminating adjacent the entrance of each of said conductors into said connector block, a conductor coating on the outer surface of said block electrically connected with the individual metal sheaths for said conductors, said cable sections having outer metal sheaths and a metal housing enclosing said connector block and joining said outer metal sheaths.

12. The combination with adjacent ends of multiple conductor cable sections having separately insulated conductors, of a connector block of solid dielectric material having higher specific inductive capacity than the insulation of said conductors, said connector block having spaced passages therethrough opening adjacent each other at opposite ends of said block, and separate projections on said block surrounding the openings at the ends of said passages.

13. The combination with adjacent ends of multiple conductor cable sections having separately insulated conductors, of a connector block of solid dielectric material having higher specific inductive capacity than the insulation of said conductors, said connector block having spaced passages therethrough opening adjacent each other at opposite ends of said block, separate projections on said block surrounding the openings at the ends of said passages and a conductor covering on said projections.

14. The combination with adjacent ends of multiple conductor cable sections having separately insulated conductors, and coverings of conducting material disposed over the insulation of said conductors, of a connector block of solid dielectric material, said connector block having spaced passages therethrough opening adjacent each other at opposite ends of said block, separate projections on said block surrounding the ends of said passages, a covering of conducting material disposed over the projections on said block and connected with the conductor covering of said cable sections, and a metal housing disposed about said connector block and connected with the covering of said cable sections.

In testimony whereof I have signed my name to this specification on this 12th day of March, A. D. 1927.

ARTHUR O. AUSTIN.